US006479087B1

(12) United States Patent
Cole et al.

(10) Patent No.: US 6,479,087 B1
(45) Date of Patent: Nov. 12, 2002

(54) CHEESE DEPOSITING METHOD

(75) Inventors: Frank Cole, Glenview, IL (US); Alan Hairsine, Glenview, IL (US)

(73) Assignee: Kraft Foods Holdings, Inc., Northfield, IL (US)

( * ) Notice: Subject to any disclaimer, the term of this patent is extended or adjusted under 35 U.S.C. 154(b) by 0 days.

(21) Appl. No.: 09/661,961

(22) Filed: Sep. 14, 2000

Related U.S. Application Data

(60) Provisional application No. 60/153,798, filed on Sep. 14, 1999.

(51) Int. Cl.[7] .............................. A21D 8/02; A21D 8/06; A01J 25/12; A23P 1/12
(52) U.S. Cl. ...................... 426/283; 426/502; 426/516; 426/517; 426/520; 426/523
(58) Field of Search ................................. 426/391, 516, 426/520, 283, 502, 517, 523

(56) References Cited

U.S. PATENT DOCUMENTS

| | | | | |
|---|---|---|---|---|
| 3,685,744 A | | 8/1972 | Ludy, Jr. .................... 239/552 |
| 3,727,308 A | * | 4/1973 | Ross ............................. 31/89 |
| 3,908,584 A | | 9/1975 | Raque ........................... 118/2 |
| 3,982,033 A | | 9/1976 | Zito ............................ 426/302 |
| 4,661,361 A | * | 4/1987 | Mongiello et al. .......... 426/283 |
| 4,669,254 A | | 6/1987 | Muzzarelli .................... 53/518 |
| 5,069,921 A | | 12/1991 | Madanat ..................... 426/283 |
| 5,200,216 A | * | 4/1993 | Braz et al. .................... 426/36 |
| 5,417,996 A | | 5/1995 | Brink .......................... 426/502 |
| 5,789,009 A | * | 8/1998 | Kordic et al. ................ 426/391 |
| 6,286,708 B1 | * | 9/2001 | Scheibmeir et al. ........ 220/607 |
| 6,403,138 B1 | * | 6/2002 | Arora .......................... 426/516 |

FOREIGN PATENT DOCUMENTS

| | | | |
|---|---|---|---|
| EP | 0 146 765 A2 | 7/1985 | ........... A01J/25/00 |
| EP | 0 501 158 A1 | 1/1992 | ........... A21C/3/04 |
| EP | 0 741 972 A1 | 11/1996 | ........... A21C/9/04 |
| WO | WO 89/00008 | 1/1989 | ........... A21C/11/00 |
| WO | WO 99/08537 | 2/1999 | ........... A21D/13/00 |

OTHER PUBLICATIONS

RD 417040A, Barhost et al, Jan. 1999, Research Disclosure p. 70–75.*

* cited by examiner

*Primary Examiner*—Keith Hendricks
*Assistant Examiner*—Drew Becker
(74) *Attorney, Agent, or Firm*—Fitch, Even, Tabin & Flannery

(57) ABSTRACT

A system and method are provided for forming IQF shreds of mozzarella cheese into a bead form and depositing the bead on the periphery of a pizza crust for forming a pizza with a cheese stuffed rim. The IQF shreds are heated and then extruded to form the bead placed on the crust periphery via a high speed extrusion head. Heating and extrusion techniques are disclosed that work the IQF shreds into an extrudable mass or paste that, although lacking the desired stringiness quality, reconstitutes upon baking such that stringiness comparable to more expensive string mozzarella cheese is achieved.

3 Claims, 11 Drawing Sheets

113

CHEESE DEPOSITING METHOD

This application claims benefit of provisional appln. Ser. No. 60/153,798 filed Sep. 14, 1999.

FIELD OF THE INVENTION

The invention relates to a system for depositing cheese on a pizza crust and, more particularly, to a system for forming a bead of cheese on the periphery of a crust for forming a stuffed rim thereof

BACKGROUND OF THE INVENTION

Currently, precooked frozen pizzas that have a rim stuffed with cheese are made by manually placing strips of string mozzarella cheese about the periphery of the crust with the edge of the crust folded over thereon. As is apparent, the manual labor required with the making of the stuffed rims is labor intensive and limits production rates.

Another shortcoming of the above-described process is in the use of string cheese. First, string cheese is a relatively expensive raw material due in part to the fact that it is a perishable item which requires that it be manufactured when fresh. Another problem is that string mozzarella cheese typically is not manufactured in large quantities because of its perishable nature, e.g. shelf life of approximately 14 days. On the other hand, IQF (Individually Quick Frozen) shreds of mozzarella cheese are generally lower in price because they are frozen which allows the manufacturer to make large quantities of the cheese when their raw material costs therefor are low and slow down or temporarily cease manufacture when raw materials are at higher costs.

Accordingly, there is a need for an improved system and method for producing pizza crusts having cheese filled rims. Further, the system and process should be able to produce large quantities of the stuffed crusts with high production throughput while minimizing costs associated therewith.

SUMMARY OF THE INVENTION

In accordance with the invention, a system and method are provided for forming IQF shreds of mozzarella cheese into a bead form and depositing it on the periphery of a crust for a pizza. The invention heats and extrudes the IQF shreds with the extrudable mass formed into a bead for placement on the crust about the periphery thereof. The body of the cheese in its bead form lacks the desired stringiness characteristic of string mozzarella cheese. This stretchiness or string characteristic is one feature that makes string mozzarella cheese particularly well-suited for use with pizza. However, after the pizza crust including the bead of cheese is baked, it has been found that the cheese reconstitutes to provide a stringiness characteristic thereto similar to that provided by string mozzarella cheese.

In one form of the invention, a system is provided for forming a paste-like bead of cheese from small frozen shreds of cheese and depositing the bead on a pizza crust. The system includes a heating apparatus having a chamber for receiving the frozen cheese shreds and a tempering portion for raising the temperature of the cheese shreds for further processing. An extrusion apparatus is provided for forming the cheese shreds into an extrudable mass. The extrusion apparatus includes an advancing mechanism which drives the mass of cheese for being deposited onto the pizza crust. An extrusion head is provided for the extrusion apparatus and has at least one outlet from which the cheese exits to form and deposit the bead on the crust. Accordingly, the present system allows for use of IQF mozzarella shreds and obviates the manual labor of having workers manually place the mozzarella strings on the crust about its periphery, thus reducing raw material and labor costs associated with the process of forming cheese stuffed rims for frozen pizzas.

In another aspect of the invention, an automated method of making pizza crusts having a rim full of cheese is provided. The automated method includes providing a crust having a peripheral region thereabout, heating small shreds of frozen mozzarella cheese, extruding the heated mozzarella cheese to a smooth paste-like body of cheese in a bead form with the body lacking stringiness, depositing the bead of cheese about the peripheral region of the crust, folding an edge of the crust over the bead of cheese, and baking the crust with the mozzarella cheese bead reconstituting so that the body has stringiness. The method uses IQF mozzarella shreds formed into a paste so it can be laid down as a bead about the crust with the body of the bead lacking the stringiness quality desired for pizza cheeses. However, after cooking, the mozzarella in the bead reconstitutes so that it has string similar to the more expensive string mozzarella cheese.

DETAILED DESCRIPTION OF THE PREFERRED EMBODIMENT

Figure 1:
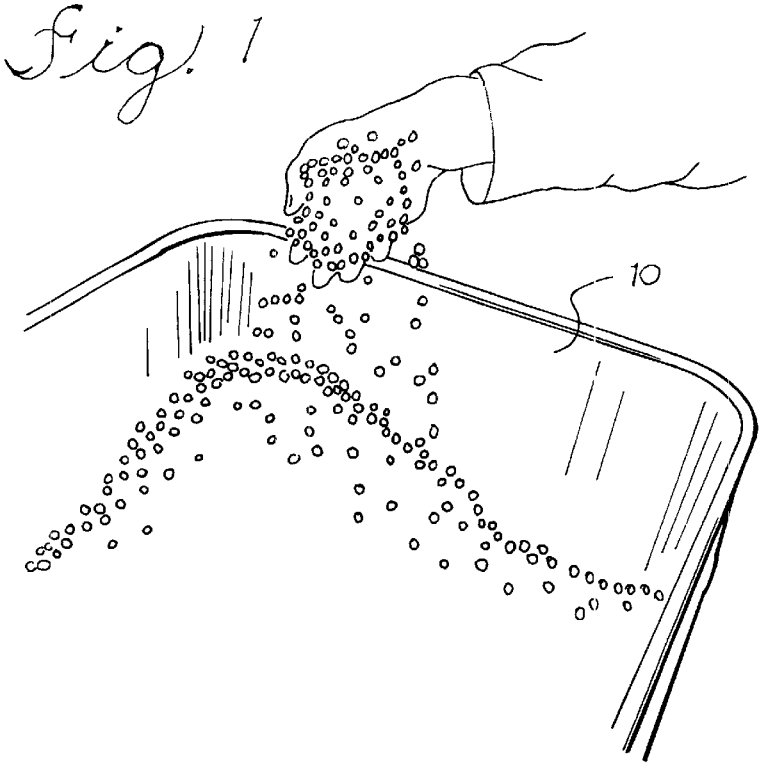
FIG. 1 is a perspective view of IQF shreds of mozzarella cheese.
Figure 2:
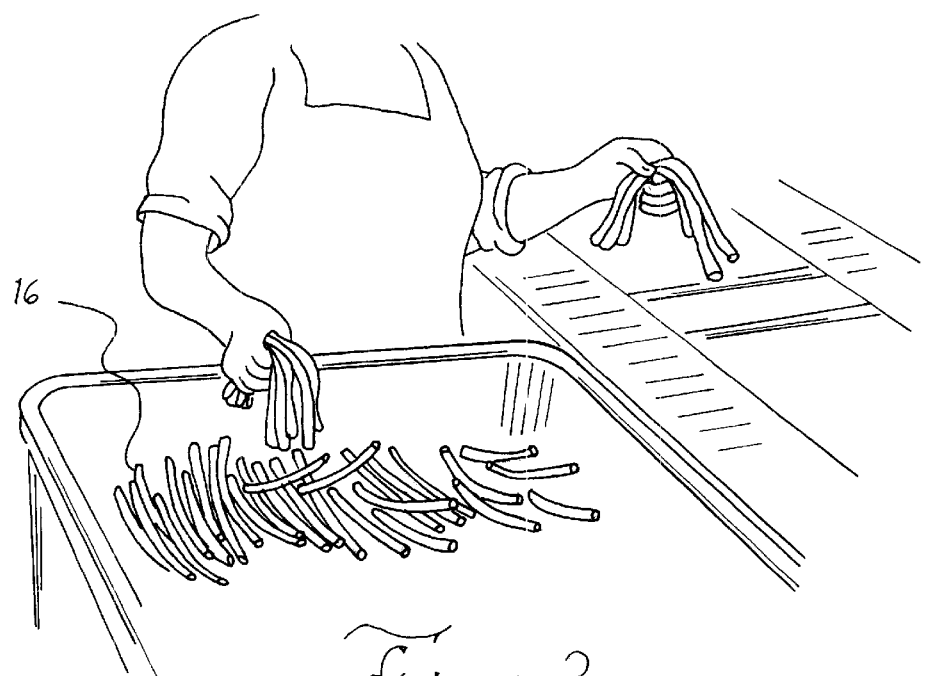
FIG. 2 is a view of string mozzarella cheese and manual placement thereof on pizza crusts.

The present invention provides a system and method that allows for the use of IQF shreds 10 (FIG. 1) of mozzarella cheese such as LMPS mozzarella to be used as the starting material in making a stuffed pizza crust 12, and in particular, a stuffed rim 14 thereof. The use of the small frozen IQF shreds, e.g., quarter inch by quarter inch blocks, is advantageous over the prior use of string mozzarella cheese 16 (FIG. 2) in terms of costs and because frozen IQF shreds 10 can maintain their melt characteristics for long periods of time and without experiencing the negative effects of enzyme modification before the cheese ages. In addition, the present system and method as described hereinafter provides for automated depositing of the bead 18 of mozzarella cheese having a smooth paste-like consistency on the crust thus avoiding the manual labor required for having workers manually place the string cheese 16 about the crust 12 for making the stuffed rims 14 thereof.

Figure 3:
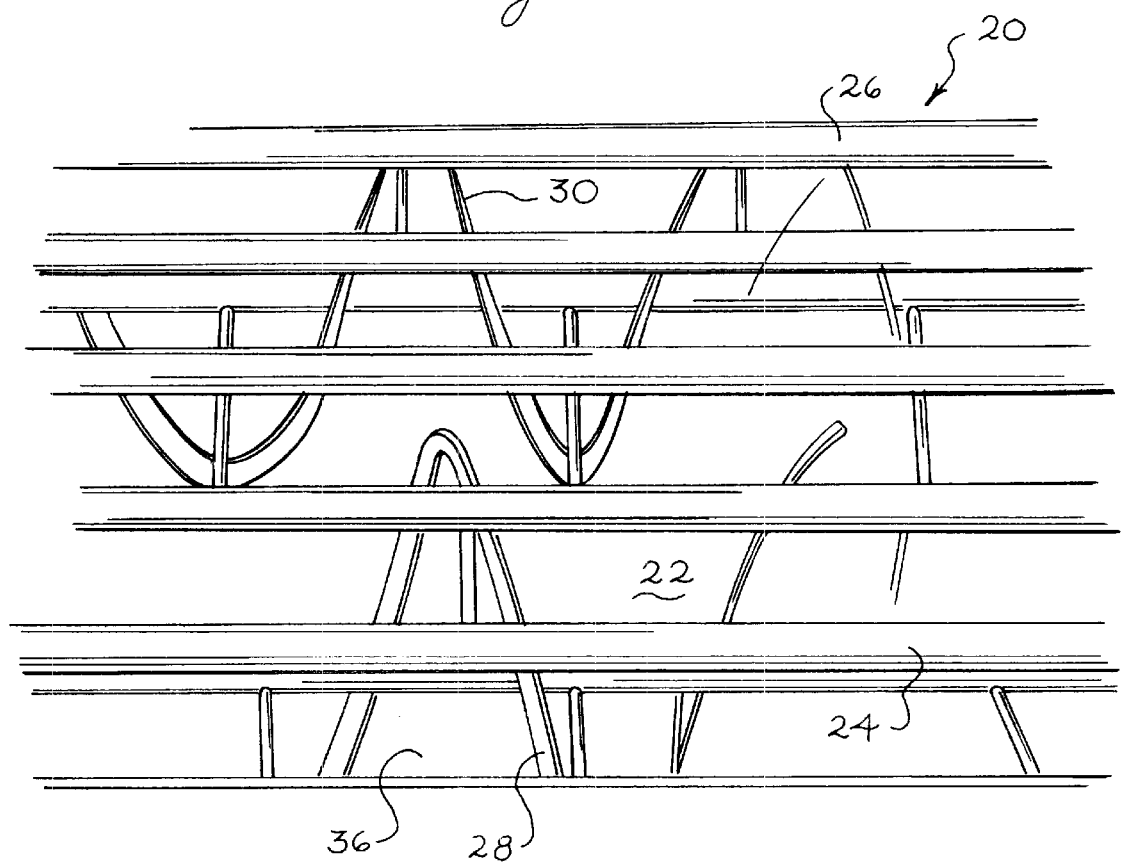
FIG. 3 is a perspective view of a ribbon blender.
Figure 4:
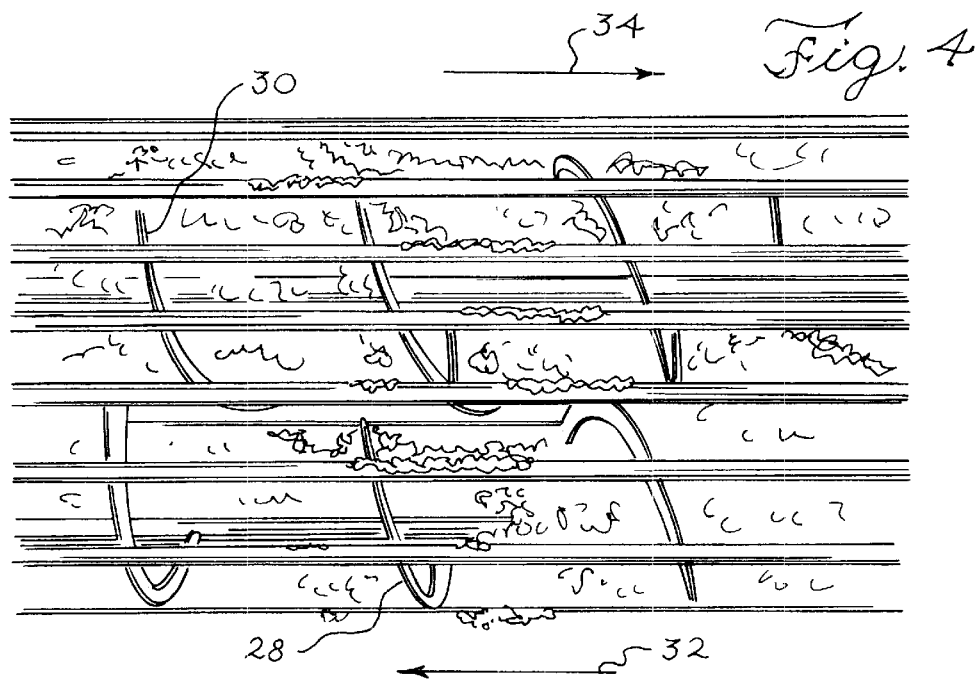
FIG. 4 is a perspective view of the ribbon blender of FIG. 3 with IQF cheese shreds therein.

Initially, the IQF shreds 10 are fed into a heating apparatus 20 in the form of a ribbon blender, as shown in FIGS. 3 and 4. The ribbon blender 20 includes a chamber 22 having a pair of laterally spaced drive shafts 24 and 26 that are driven for rotation in opposite directions therein. Two helical or auger type ribbons 28 and 30 are mounted to the drive shaft so that rotation of the shafts 24 and 26 causes the IQF shreds to travel longitudinally in the chamber 22 first in one direction as indicated by arrow 32 as driven by helical ribbon 28 and then in the opposite direction indicated by arrow 34 as driven by helical ribbon 30.

The IQF cheese shreds 10 are tempered or heated in the chamber 22 via a heating portion of the ribbon blender 20 in the form of a hot water jacket 36 that is disposed about the chamber 22. As the IQF shreds 10 traverse the length of the chamber 22 in both directions 32 and 34, the dwell time in the chamber 22 is maximized for heat transfer from the hot water jacket 36 to raise the temperature of the IQF mozzarella shreds 10.

Figure 5:
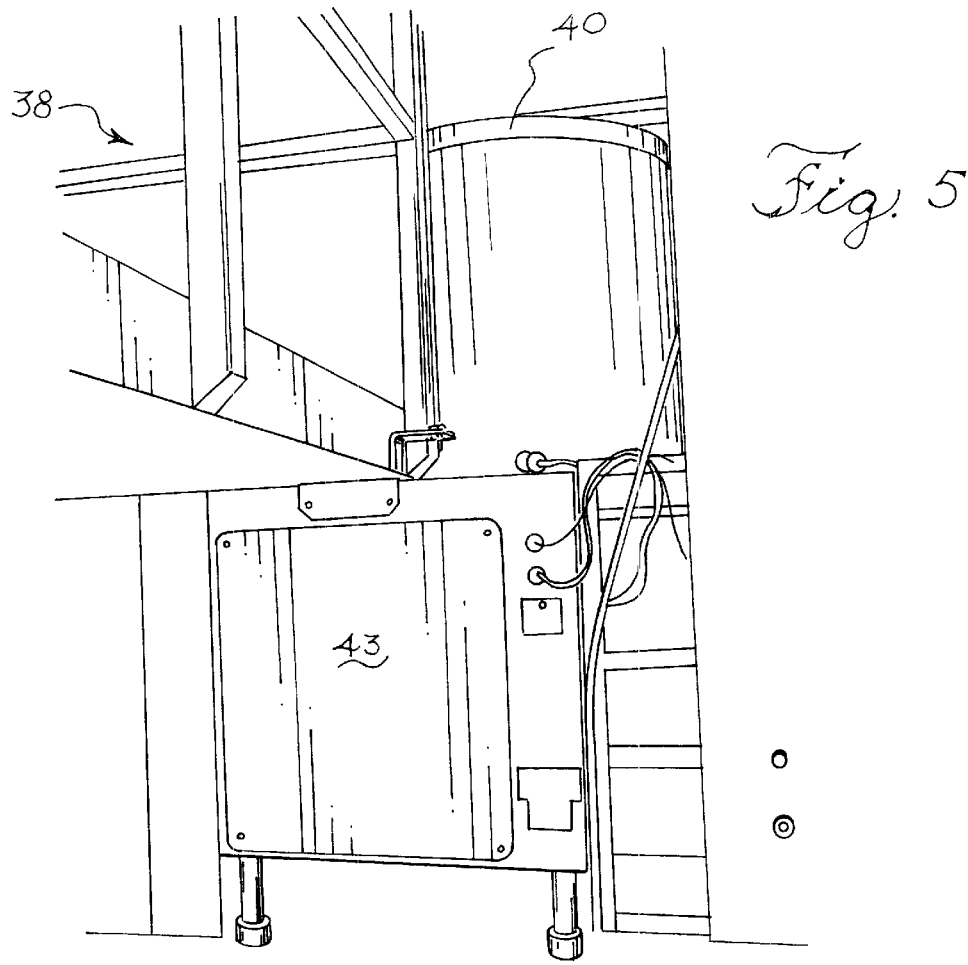
FIG. 5 is a perspective view of an extruder including a hopper and extruder housing for receiving the IQF shreds of cheese after processing by the ribbon blender.

After the IQF mozzarella shreds 10 have been tempered or heated in the ribbon blender 20, they are transferred to an extrusion apparatus 38 as shown in FIG. 5.

Figure 6:
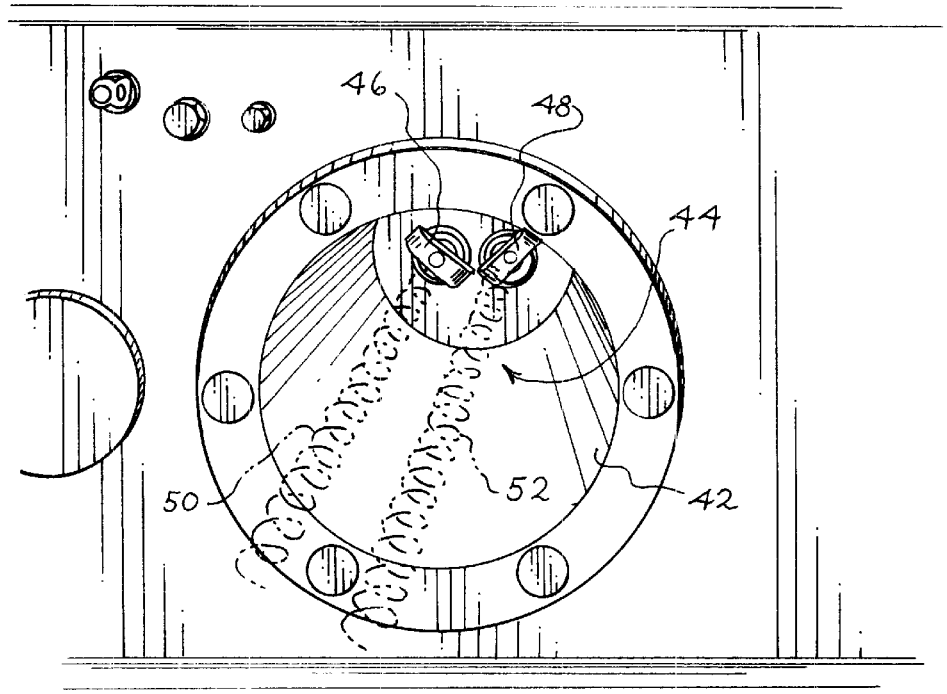
FIG. 6 is a perspective view of a passageway of the extruder including rotary drives for extruder screws shown in phantom.

The extrusion apparatus 38 includes a hopper 40 which funnels and feeds the tempered IQF mozzarella shreds 10 into a passageway 42 in the housing 43 of the extruder 38 below the hopper 10, as shown in FIG. 6. The passageway 42 redirects the tempered IQF mozzarella shreds 10 in a generally horizontal direction via an advancing mechanism, generally designated 44. The advancing mechanism 44 includes a pair of rotatable couplings 46 and 48 for rotating extruder screws, 50 and 52, shown in phantom.

The screws 50 and 52 extend parallel to each other and are rotated in the same direction so that the IQF mozzarella shreds 10 are advanced from one end of the passageway 42 downstream to extrusion heads 54. The screws 46 and 48 are sized relative to the passageway 42 and rotated at a speed such that the IQF mozzarella shreds 10 are worked into an extrudable mass. It is important that the extrusion be tailored so that the working of the IQF mozzarella shreds 10 does not release oil therefrom and generate oiling off problems, as are known to be undesirable in the pizza making art. It has been found that generating a pressure of approximately 300 to 400 psi in the extruder 38 is sufficient to create an extrudable mass of the cheese without generating oiling off problems. To this end, a control is provided which senses a maximum pressure that cannot be exceeded before the control will act to shut off the drive for the extruder screws 50 and 52.

Figure 7:
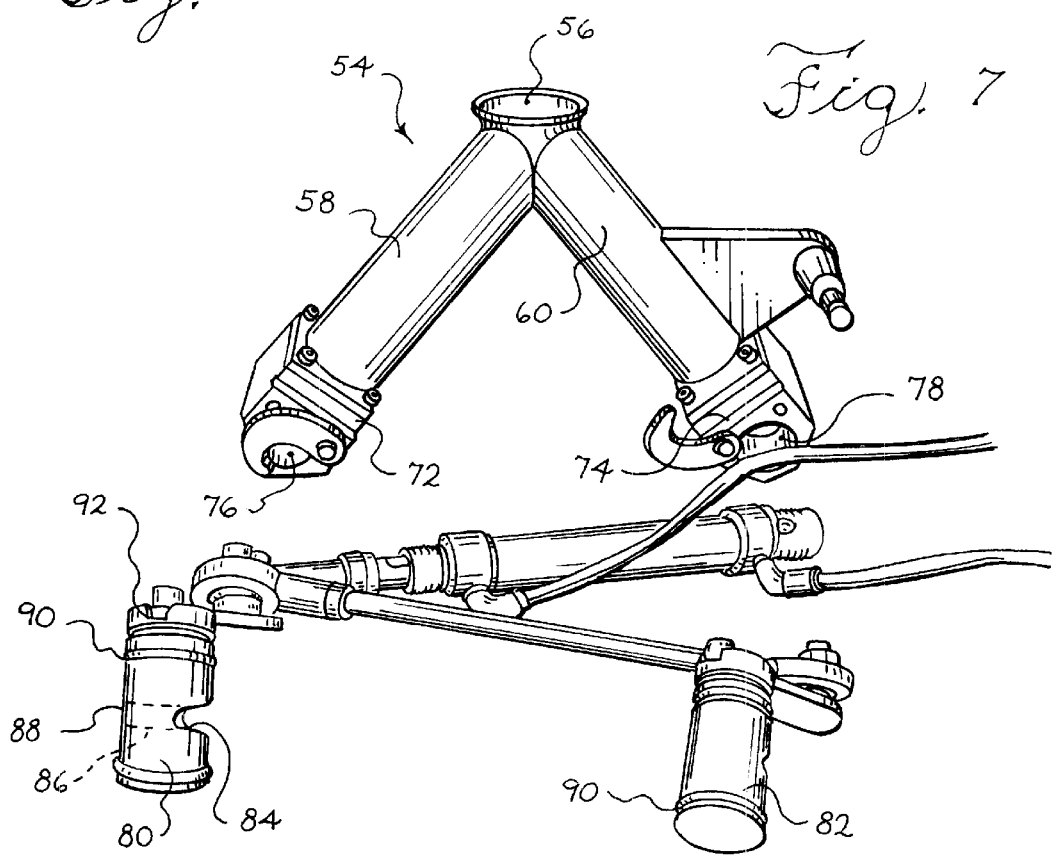
FIG. 7 is a perspective view of a disassembled extrusion head including rotary valve members and control linkages therefor.
Figure 8:
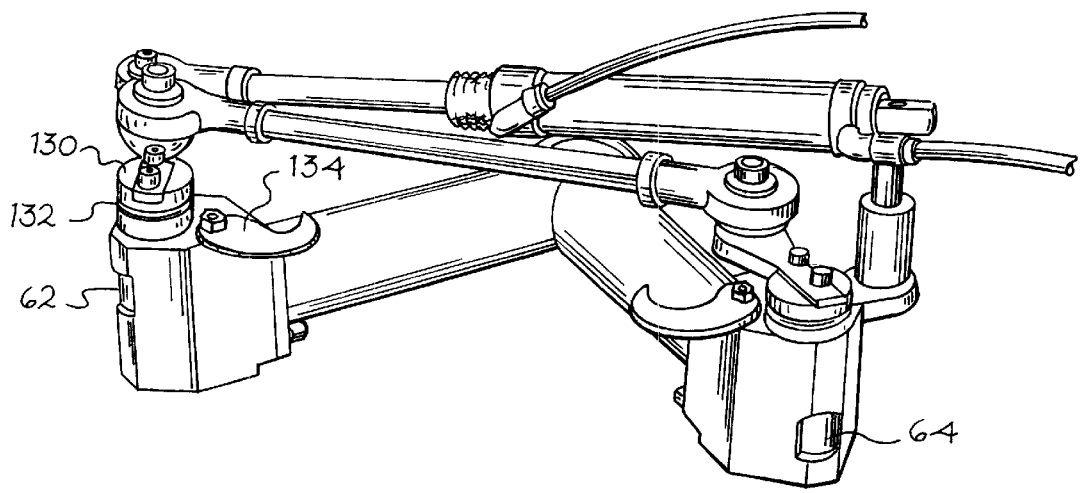
FIG. 8 is a perspective view similar to FIG. 7 showing the extrusion head assembled.
Figure 9:
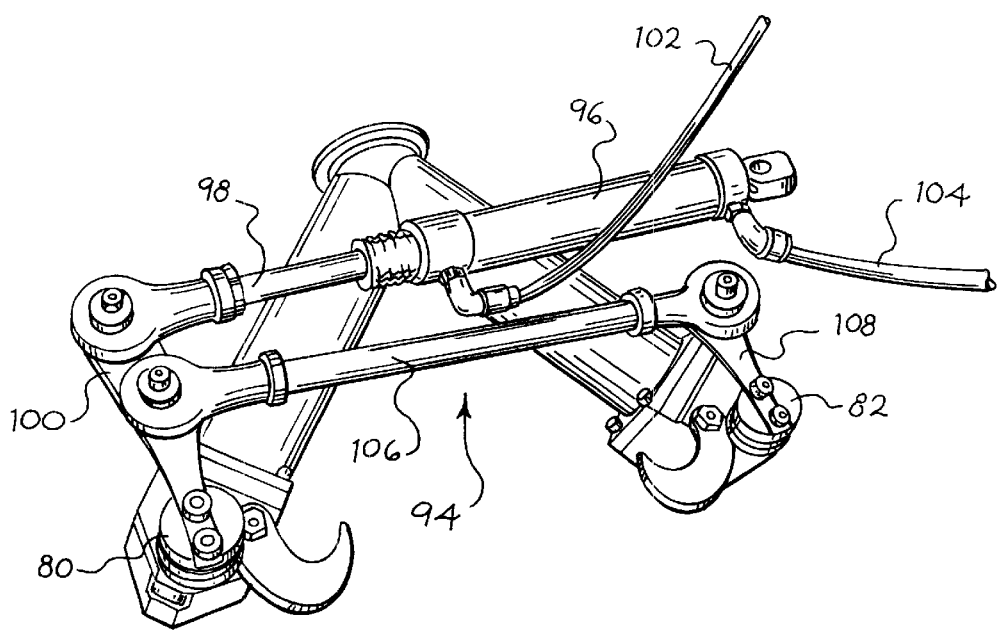
FIG. 9 is a perspective view of the assembled extrusion head similar to FIG. 8.

FIGS. 7–9 depict an extrusion head 54 which communicates with the extruder passageway 42. In the illustrated and preferred form, the extruder head 54 has an inverted V-shape including an inlet 56 from which a pair of tubular arms 58 and 60 are branched having respective outlets 62 and 64 at ends distal from the inlet 56.

Figure 11:
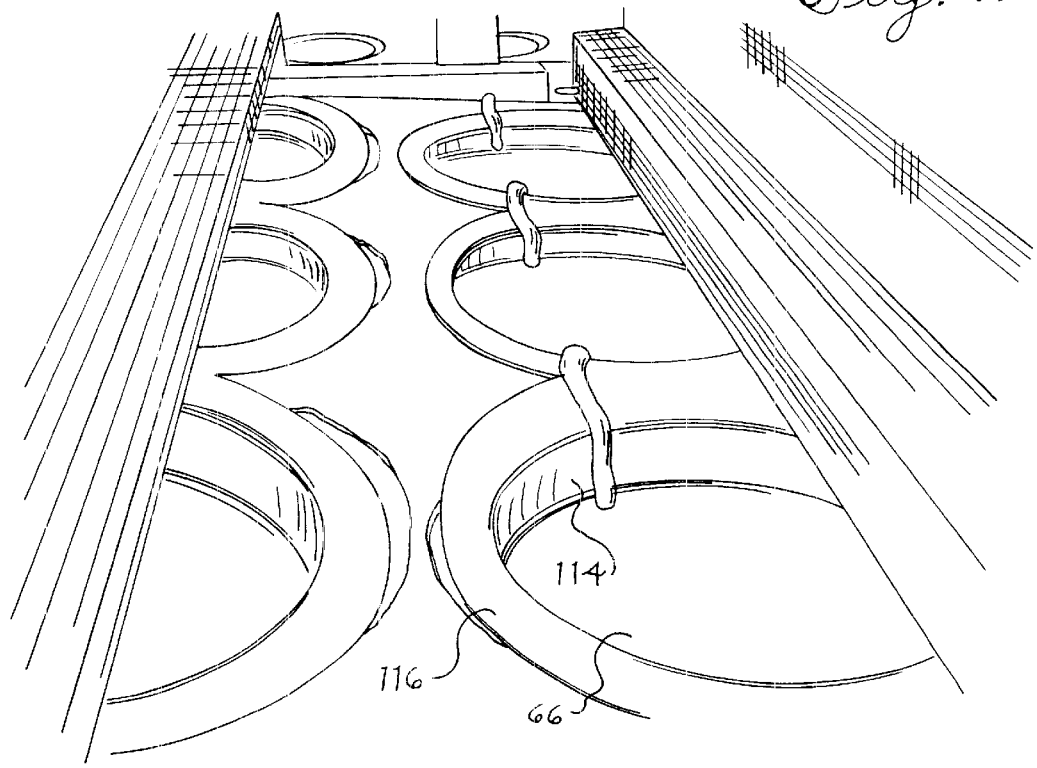
FIG. 11 is a perspective view of dough formed into crusts in the pan.
Figure 12:
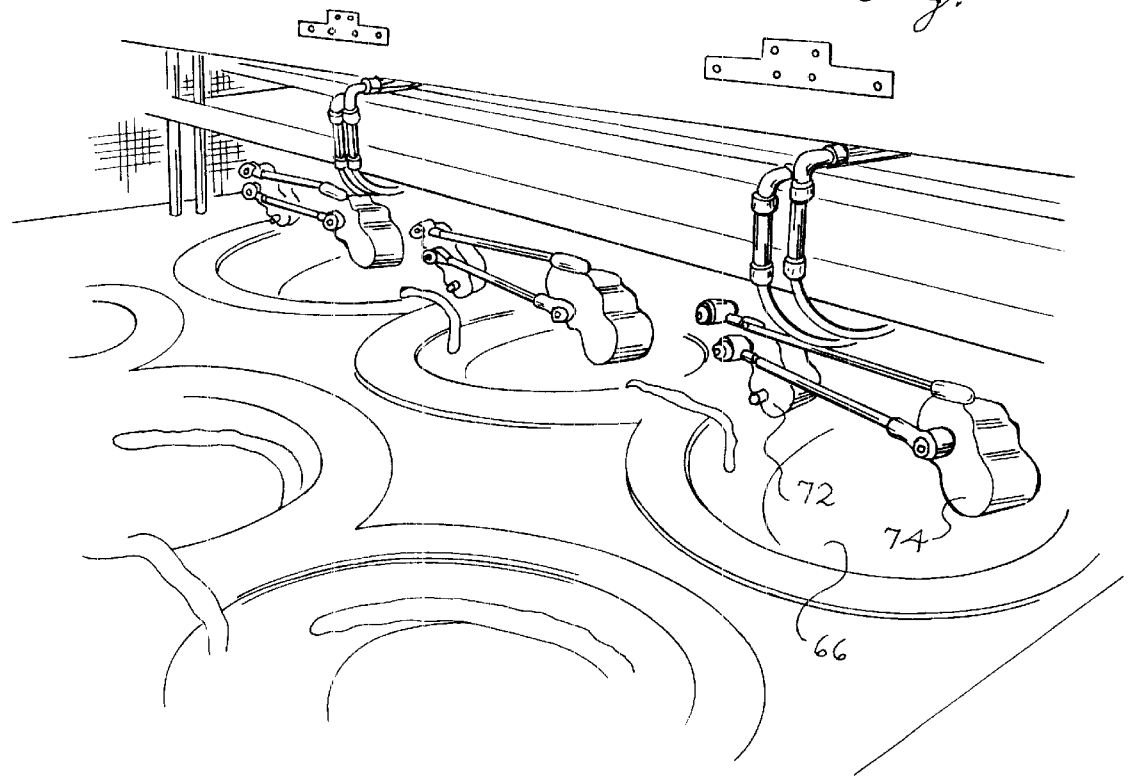
FIG. 12 is a perspective view of the extrusion heads over the crusts.
Figure 13:
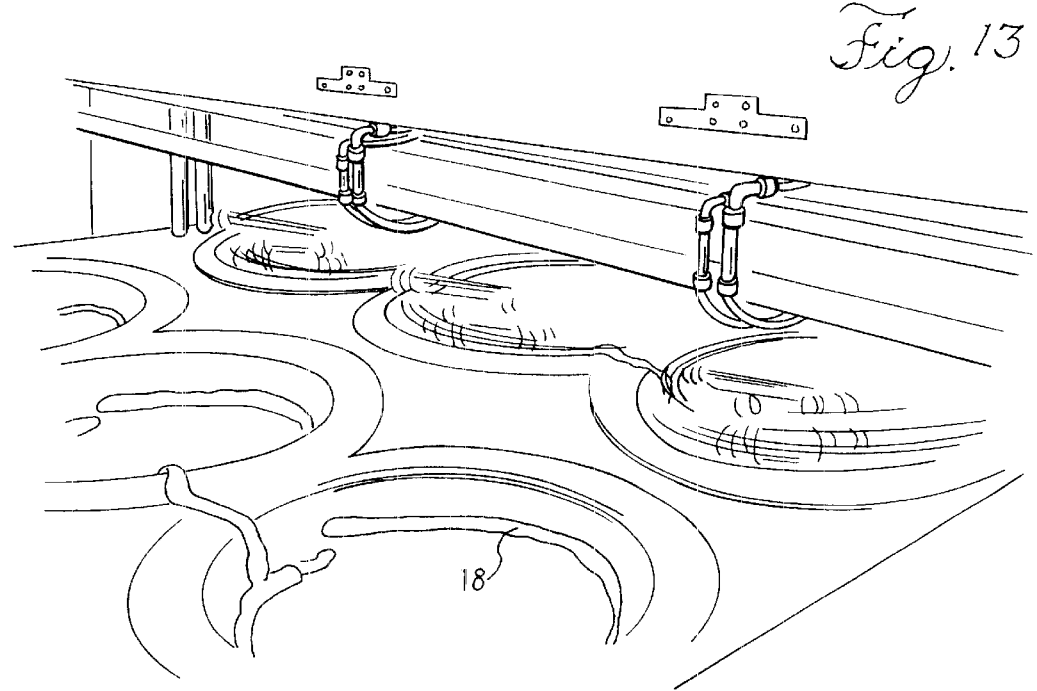
FIG. 13 is a perspective view of the extrusion heads depositing a bead of cheese on the crusts.
Figure 14:
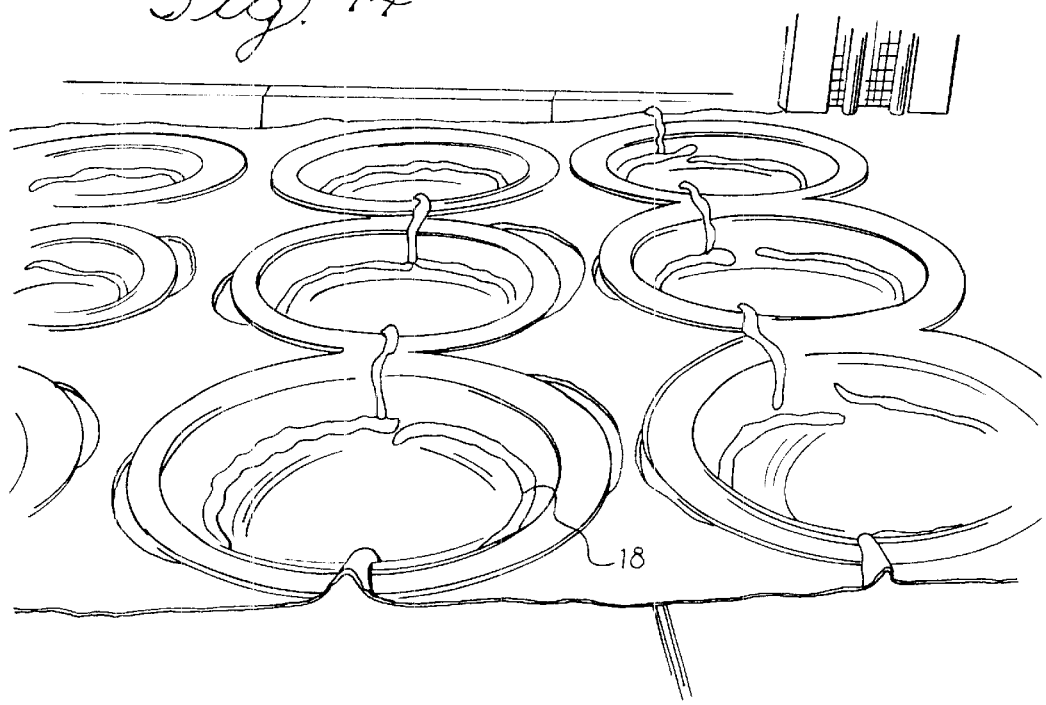
FIG. 14 is a perspective view of the crusts having beads of cheese thereon.
Figure 15:
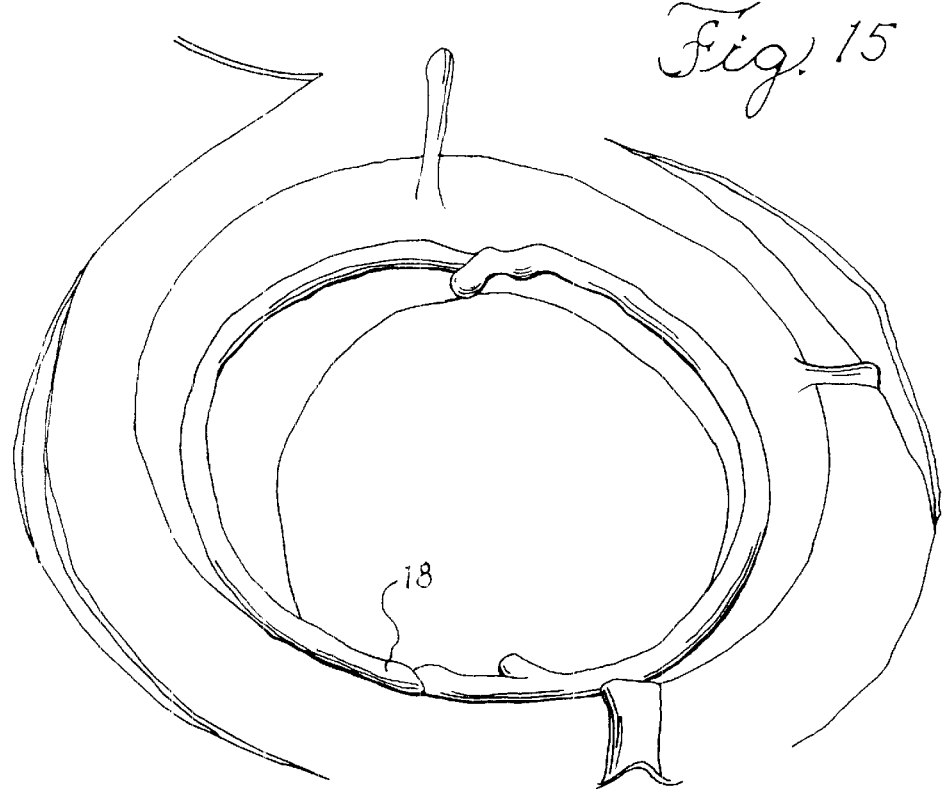
FIG. 15 is a perspective view of one of the beads of cheese on a single one of the crusts.

The extrusion heads 54 are preferably mounted so that their inlets 56 are disposed above the center of the pizza crust 12 so that rotating the extrusion head 54 via a drive deposits the bead 18 having a smooth, paste-like consistency about a peripheral region 66 of the crust 12. As noted, the body of cheese in the bead form lacks the desired stringiness characteristic for pizza cheese. The distance between the outlets 62 and 64 substantially matches that of the diameter of the predetermined position on the crust peripheral region 66 at which the substantially circular bead 18 is to be deposited. Referring to FIGS. 12–14, the extrusion head 54 is rotatably coupled to the extruder 38 so that the head 54 can be rotated 180 degrees in one direction while it deposits the bead 18 with each arm 58 and 60 depositing one half of the circular pattern for the bead 18, and then being rotated back with the outlets 62 and 64 closed to its starting position for the next crust 12. As shown in FIG. 11, a crust forming pan 68 is provided with six openings 70 in which the pizza crust is initially formed. Accordingly, in the preferred and illustrated form six extrusion heads 54 are coupled to the extruder 38 and are simultaneously rotated by a drive including a motor and a belt for rotating the rotatable couplings between the extrusion heads 56 and the extruder 38. In this fashion, extremely high production rates can be obtained with the system and method of the present invention. In this regard, approximately one-hundred crusts per minute having beads 18 of mozzarella cheese deposited thereon can be made.

As can be seen in FIGS. 7–9, the ends of the arms 58 and 60 distal from the inlet 56 include respective valve housings 72 and 74 having cylindrical throughbores 76 and 78 that are oriented transverse to the length of the arms 58 and 60. The bores 76 and 78 are adapted to receive rotary valve members 80 and 82 therein. The valve members 80 and 82 have a cylindrical body with a T-shaped cutout extending transversely therethough. More specifically, the T-shaped cutout includes a slotted inlet end 84 from which a central passageway 86 extends to an outlet end 88. Accordingly, the slotted inlet end 84 extends for a greater extent along the circumference of the cylindrical body of the rotary valve members 80 and 82 than the outlet end 88 thereof. In this manner, as the rotary valve members 80 and 82 are rotated between open and closed positions in their respective housings 72 and 74 as will be described more fully hereinafter, the elongated or slotted inlet end 84 stays in communication with the passageway through the tubular arms 58 and 60 and thus the passageway 42 of the extruder 38 whether in the opened or closed positions. This provides advantages in terms of the starting and stopping of the depositing of the bead 18 as the slug of cheese in the rotary valve members 80 and 82 remains, in effect, connected to the extrudable mass in the head 54 and extruder 38 so that discontinuities or other deformities that may be created in the circular pattern of the bead 18 at the starting and stopping points of the depositing of the bead 18 by the extruder head arms 58 and 60 are minimized.

The cylindrical rotary valve members 80 and 82 are sealed in the bores 76 and 78 of their respective housing 72 and 74 by way of annular O-ring seals 90 mounted about either end thereof. The valve members 80 and 82 are provided with an extension portion 130 which projects out from the housing, as best seen in FIGS. 8 and 9. The extension portion 130 has an annular groove 132 formed thereabout and into which a hook member 134 pivotally mounted to each of the housings 72 and 74 is received to prevent the valve members 80 and 82 from sliding laterally out from the housing bores 76 and 78.

For shifting the rotary valve members 80 and 82 between their opened and closed positions, control linkages, generally designated 94 are provided. The linkages 94 can include a power cylinder such as pneumatic cylinder 96 having a piston rod 98 connected at its distal end to a link plate 100. The plate 100 is attached to the piston rod 98 at one end and to the rotary valve member 80 at its other end so that as the piston rod 98 is extended and retracted by operation of pressurized air through lines 102 and 104, the plate 100 will rotate the valve member 80 so that its outlet end 88 is in registry with the outlet 62 of the valve housing 72 with the valve member 80 in its open position or rotated so that the valve member outlet end 88 is sealed by a wall of the housing 72 in its closed position. A rod 106 is attached at one of its ends to the plate 100 intermediate the attachments of the plate 100 to the piston rod 98 and rotary valve member 80 with the rod 106 attached at its other end to a link plate 108 which, in turn, is attached to the other rotary valve member 82. In this manner, extension and retraction of the piston rod 98 rotates both the valve members 80 and 82 in a synchronized manner so that both are opened and closed at the same time.

Figure 10:
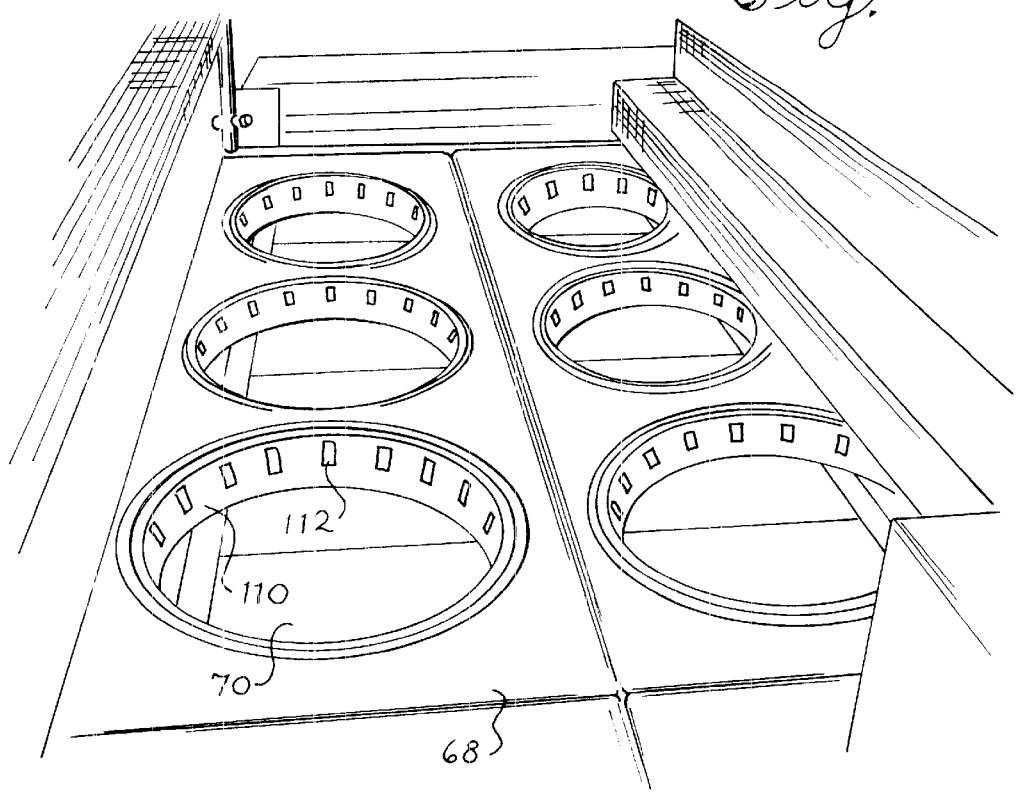
FIG. 10 is a perspective view of a crust forming pan for supporting six crusts for processing.

As previously mentioned, the preferred crust forming pan 68 has six openings 70 having generally vertical annular walls 110 bounding the openings 70 with slots 112 spaced equidistantly about the circumference of the walls 110, as best seen in FIG. 10. Dough is tamped into the openings 70 and supported by a bottom pan plate 113 therein to form initial crusts having an upstanding edge wall 114 about the peripheral region 66 of the crust and an upper flanged portion 116 projecting radially out from the top of the wall 114. The extrusion heads 54 deposit the beads 18 in a substantially circular pattern about the peripheral region 66 generally between the bottom of the crust 12 and the edge wall 114, as best seen in FIGS. 12–15.

Figure 16:
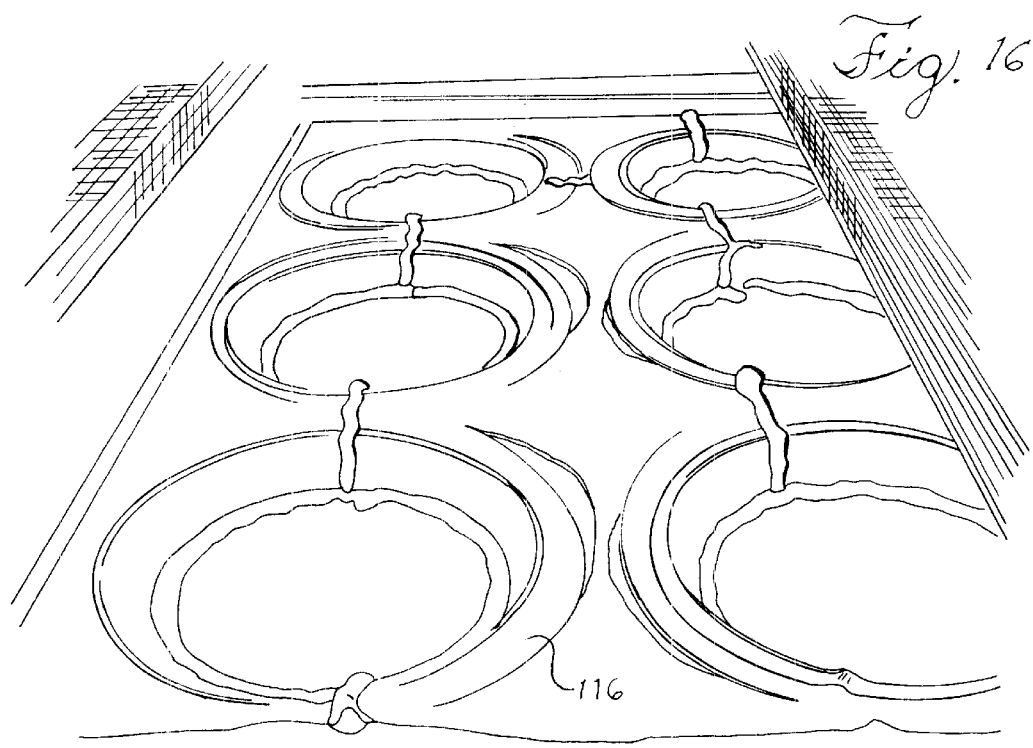
FIG. 16 is a perspective view of the upper flanged portion of the crusts cut therefrom.
Figure 17:
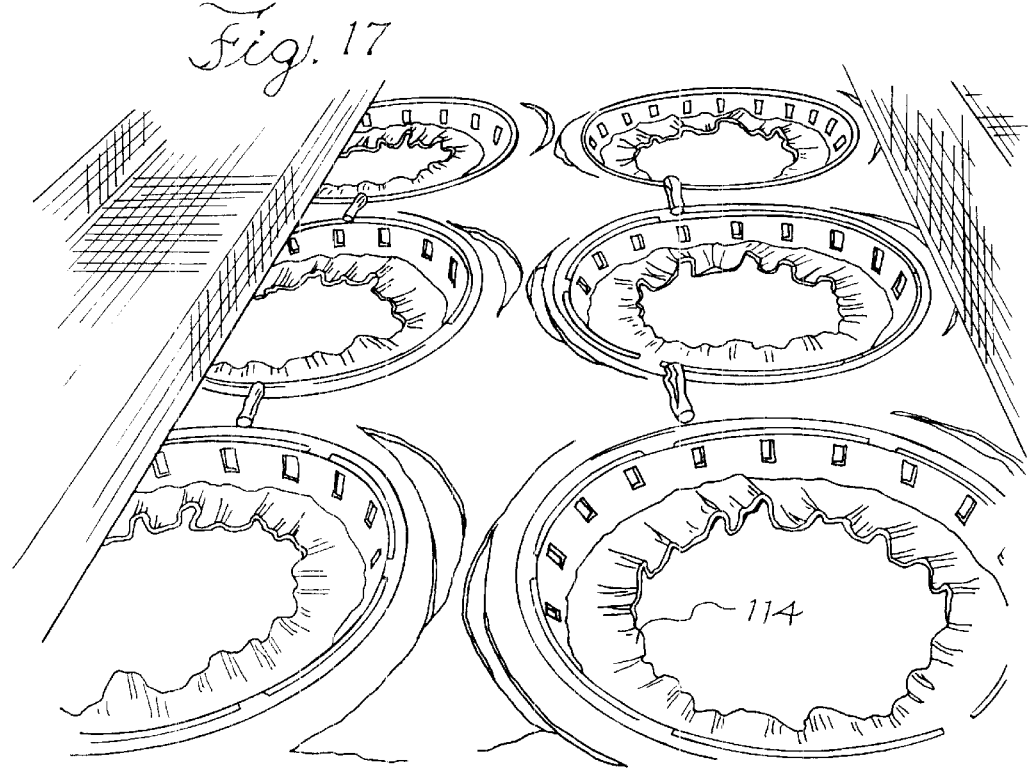
FIG. 17 is a perspective view of the upstanding edge wall folded over the cheese bead.
Figure 18:
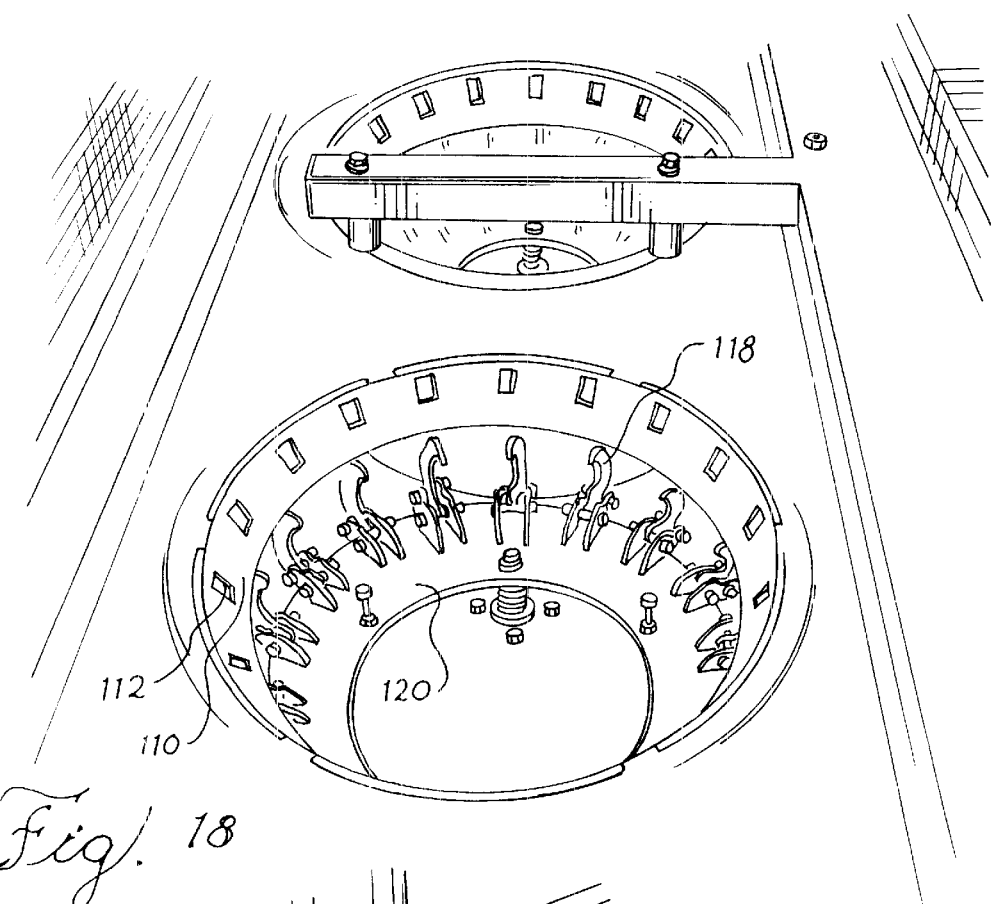
FIG. 18 is a perspective view of the fold over mechanism for folding the crust wall over the cheese bead.

Thereafter, the upper flange portion 116 is cut so as to be severed from the remainder of the crust 12, as shown in FIG. 16. The upstanding edge wall 114 is then folded over the bead 18 of mozzarella cheese, as can be seen in FIG. 17. For this purpose, several pivotal knock-down members 118 associated with each of the slots 112 is mounted to a platen 120. When the crust arrives at the fold-over station of FIGS. 17 and 18, the platen 120 is raised and the knock-down members 118 are pivoted through their slots 112 to engage the outer side of the upstanding edge wall 114 for folding it down over the circular bead 18 of cheese on the crust peripheral region 66.

Figure 19:
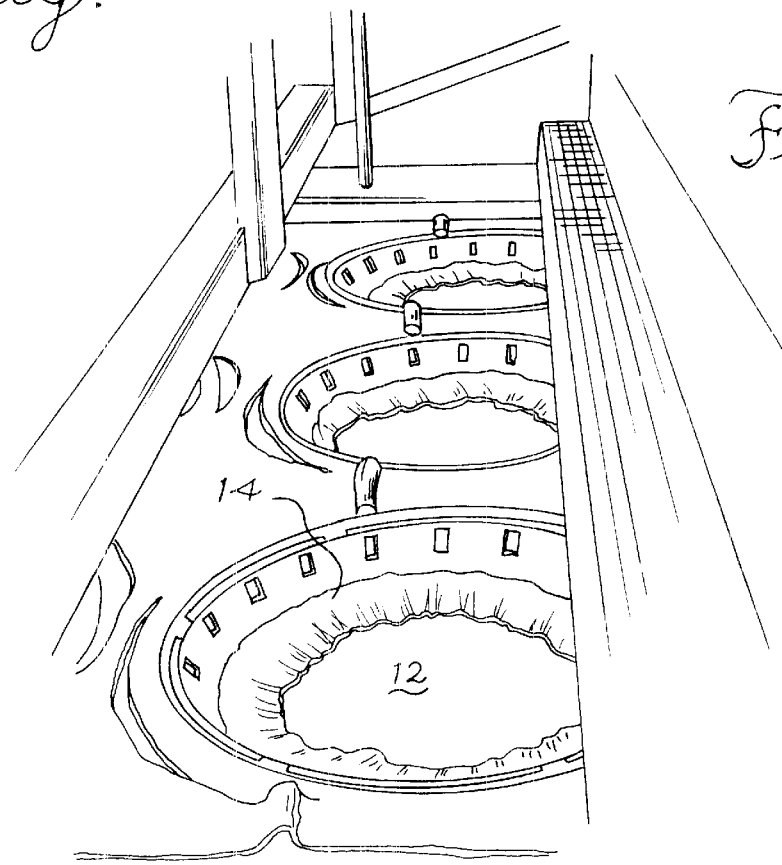
FIG. 19 is a perspective view of the crusts with the folded over wall crimped down over the cheese bead.
Figure 20:
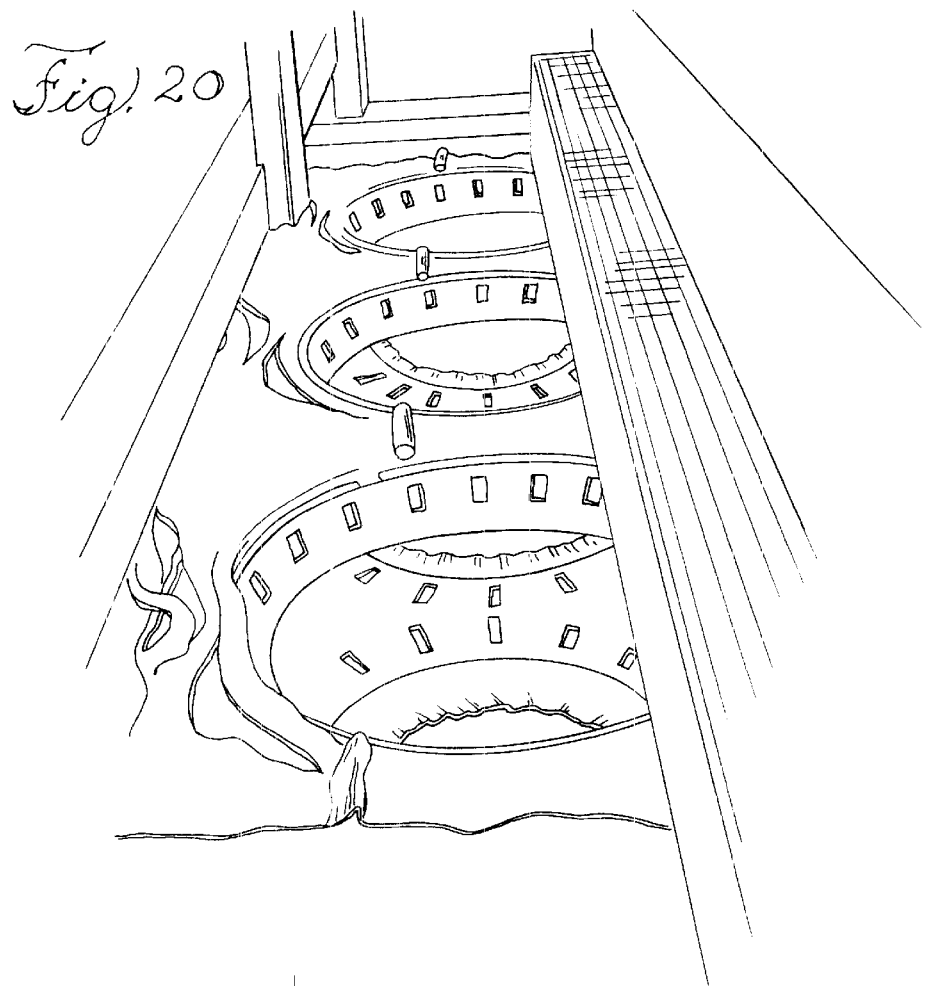
FIG. 20 is a perspective view of the crusts being dropped from the crust forming pan for further processing.
Figure 21:
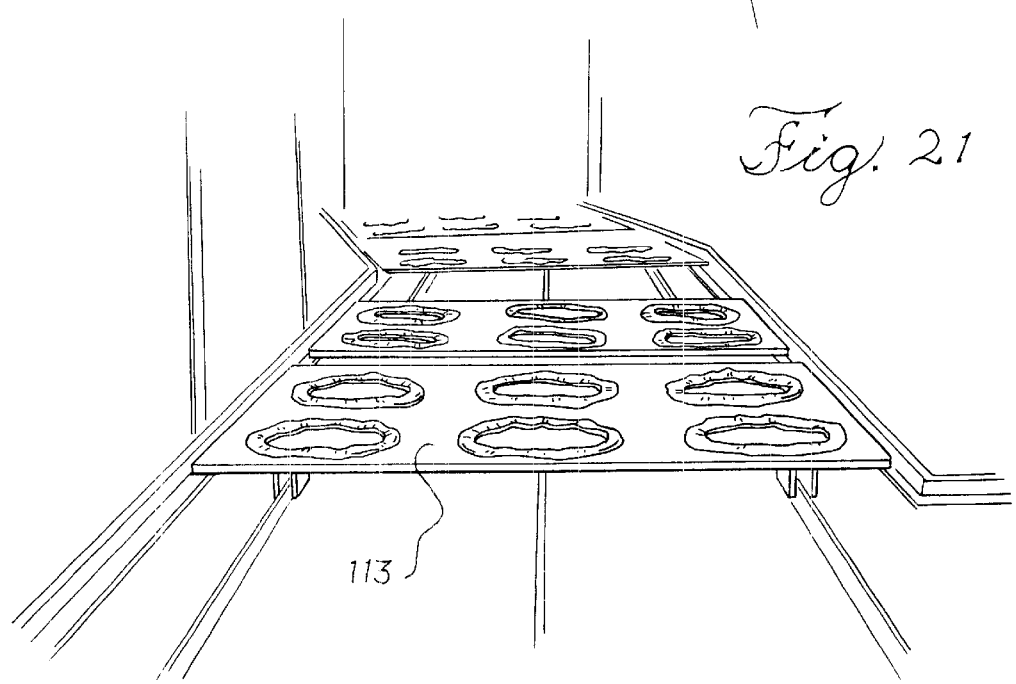
FIG. 21 is a perspective view of the crust in a support pan therefor with the rims folded over the beaded cheese.

After the edge wall 114 has been folded over as described, it is crimped (FIG. 19) to form the cheese stuffed rim 14 of the pizza crust 12. The support plate 113 for the crust 12 then drops away from the crust forming pan 68 (FIG. 20) for further processing, such as proofing and baking.

As has been stated, it has been found that after the crust 12 including the cheese bead 18 has been baked, the body of the cheese in the bead reconstitutes with the desired stringiness characteristic. It had been assumed that the mozzarella cheese after working as through an extrusion process would not obtain this quality and instead it was expected that cheese melts and/or processed cheeses would have to be used in the present application. However, it has been found that with careful design and selection of the equipment and the operating conditions thereof as specified herein, the cheese stuffed rim 12 can be formed by an automated process and using lower cost IQF shreds 10 as the starting material while achieving commercially satisfactory results in terms of the texture and stringiness characteristics of the cheese.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. An automated method of making pizza crusts having a rim filled with cheese, the automated method comprising:

providing a crust having a peripheral region thereabout;

providing small shreds of frozen mozzarella cheese for forming into cheese stuffing for the rim;

heating the small shreds of frozen mozzarella cheese;

extruding the heated mozzarella cheese within a predetermined pressure range that avoids oiling off to form a smooth paste-like body of cheese in a bead form with the body lacking stringiness;

depositing the bead of cheese about the peripheral region of the crust;

folding an edge of the crust over the bead of cheese; and baking the crust with the mozzarella cheese bead reconstituting so that the body has stringiness to form the cheese stuffed rim with stringy cheese inside.

2. The automated method of claim 1 wherein beads of cheese are deposited on crusts at a rate of approximately one hundred crusts per minute.

3. The automated method of claim 1 wherein the predetermined pressure range for extrusion is between approximately 300 psi and 400 psi.

* * * * *